(12) United States Patent
Nagel et al.

(10) Patent No.: US 9,034,451 B2
(45) Date of Patent: May 19, 2015

(54) SPLICING ADHESIVE TAPE COMPRISING SPLITTABLE CONNECTOR ELEMENTS

(75) Inventors: Christoph Nagel, Charlotte, NC (US); Kerstin Götz, Hamburg (DE)

(73) Assignee: TESA SE, Hamburg (DE)

( * ) Notice: Subject to any disclaimer, the term of this patent is extended or adjusted under 35 U.S.C. 154(b) by 0 days.

(21) Appl. No.: 13/698,105

(22) PCT Filed: May 6, 2011

(86) PCT No.: PCT/EP2011/057298
§ 371 (c)(1),
(2), (4) Date: Dec. 13, 2012

(87) PCT Pub. No.: WO2011/144466
PCT Pub. Date: Nov. 24, 2011

(65) Prior Publication Data
US 2013/0112341 A1    May 9, 2013

(30) Foreign Application Priority Data

May 20, 2010    (DE) .......................... 10 2010 029 181

(51) Int. Cl.
| | |
|---|---|
| B65H 21/00 | (2006.01) |
| B65H 19/18 | (2006.01) |
| B65H 19/10 | (2006.01) |
| C09J 7/02 | (2006.01) |
| C09J 7/04 | (2006.01) |

(52) U.S. Cl.
CPC .......... B65H 19/1821 (2013.01); B65H 19/102 (2013.01); B65H 2301/41766 (2013.01); C09J 7/0296 (2013.01); C09J 7/04 (2013.01); C09J 2203/342 (2013.01); C09J 2400/283 (2013.01); C09J 2433/00 (2013.01); Y10S 428/906 (2013.01)

(58) Field of Classification Search
CPC ..................... B65H 19/102; B65H 2301/4631; B65H 2301/46312; C09J 2203/342
USPC ...................................... 428/81, 906
See application file for complete search history.

(56) References Cited

U.S. PATENT DOCUMENTS

| | | | |
|---|---|---|---|
| 6,432,241 B1 * | 8/2002 | Congard et al. ............... | 156/157 |
| 7,087,278 B2 * | 8/2006 | Eikmeier et al. .............. | 428/40.1 |
| 7,108,220 B2 * | 9/2006 | Nagel et al. ................. | 242/556.1 |
| 8,597,751 B2 * | 12/2013 | Gotz et al. ................... | 428/40.1 |

FOREIGN PATENT DOCUMENTS

| | | |
|---|---|---|
| DE | 198 41 609 A1 | 3/2000 |
| DE | 10 2005 051 181 A1 | 4/2007 |
| DE | 10 2008 059 385 A1 | 12/2009 |
| EP | 0 757 657 A1 | 1/1998 |
| EP | 2 130 886 A2 | 12/2009 |
| WO | 03 008311 A1 | 1/2003 |

OTHER PUBLICATIONS

International Search Report for corresponding application PCT/EP2011/057298 mailed Feb. 28, 2012.

* cited by examiner

*Primary Examiner* — Alexander Thomas
(74) *Attorney, Agent, or Firm* — Norris McLaughlin & Marcus, P.A.

(57) ABSTRACT

A splicing adhesive tape having a first carrier and a first splittable connector element having a left and a right boundary edge, wherein at least one of said two edges is not straight and comprises protrusions that are round at the locations thereof protruding out the farthest, and a second splittable connector element having a left and a right boundary edge, wherein at least one of said two edges is straight, wherein the first and the second splittable connector element are disposed adjacent to each other on the carrier.

14 Claims, 1 Drawing Sheet

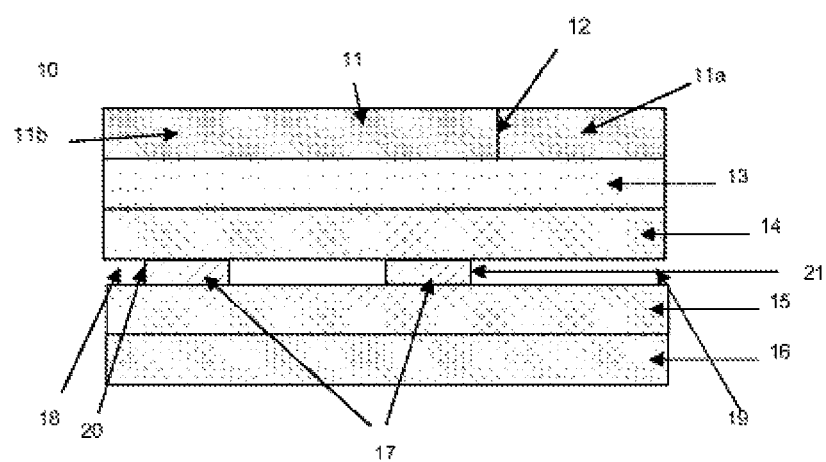

SPLICING ADHESIVE TAPE COMPRISING SPLITTABLE CONNECTOR ELEMENTS

This application is a 371 of International Patent Application No. PCT/EP2011/057298, filed May 6, 2011, which claims foreign priority benefit under 35 U.S.C. §119 of the German Patent Application No. 10 2010 029 181.1 filed May 20, 2010, the disclosures of which patent applications are incorporated herein by reference.

The present invention relates to adhesive splicing tapes for flying roll changeover, comprising a first carrier and a first splittable connecting element having a left-hand (l) and a right-hand (r) bounding edge, at least one of these two edges (l, r) being nonrectilinear and having projections (V) which are rounded at their furthest projecting points (v), and also a second splittable connecting element having a left-hand (L) and a right-hand (R) bounding edge, at least one of these two edges (L, R) being rectilinear, and the first and second splittable connecting elements being disposed adjacent one another on the carrier. The present invention further relates to wound rolls of materials in web form that are equipped with the adhesive splicing tape of the invention, and also to the use of adhesive splicing tapes of the invention in splice processes.

BACKGROUND OF THE INVENTION

Flat materials in web form, especially paper, are wound into reels. Such reels are supplied, for example, to paper-processing machines or to printing or packaging machines. During the ongoing operation of such lines it is necessary to attach the start of a new wound reel to the end of a first reel of the flat material in web form, in a flying changeover, and to join the end and start in a suitable way, without having to stop the high-speed machines during the switchover of the rolls. This operation is also referred to as splicing.

In the paper industry this operation is performed using double-sidedly self-adhesive tapes which consist essentially of a carrier layer and two layers of self-adhesive composition, in order to produce a join between the end of the old material web and the start of the new material web. In this operation, the end of the old material web becomes adhered to the start of the new material web.

In order to minimize the impulsiveness of the splicing of the radially outer end of the new roll (its start, so to speak) to, for instance, the end of the outgoing roll, when joining the old to the new web, it is necessary, in a conventional way, to accelerate the new roll to a rotational speed which is such that its peripheral speed corresponds to the speed of the old web. During this acceleration, the radially outer end is exposed to centrifugal forces, while at the same time the slip stream engages beneath the web end. So that the paper roll withstands these forces and does not "explode", the adhesive tape used must ensure a considerable locking strength until the splice has been made. After the desired flying splice has come about, however, the desire is for an extremely low locking strength.

As a solution to this problem, DE 10 2005 051 181 A1 proposes an adhesive splicing tape comprising a splittable adhesive tape having a left-hand (l) and a right-hand (r) bounding edge, at least one of these two edges (l, r) being nonrectilinear, and the nonrectilinear edge (l) having projections (V) which are rounded at their furthest projecting points (v). Whereas nonrectilinear geometries in the splittable system ensure a balanced compromise between high locking strength in relation to the active centrifugal forces, and easy opening after the splicing operation, such adhesive tapes are associated with problems, which occur particularly when preparing wound rolls of materials in web form for splicing. For instance, in the case of nonrectilinear geometries in the splittable system, the unwinding of the adhesive tape is accompanied by stresses on the leading edges of the splitting system, which are transverse relative to the unwind direction, and also, in certain cases, by the incipient splitting of the splittable strip. Premature, incipient splitting occurs especially in the case of wave shapes or with those geometries which are characterized by a high geometric slope. To solve this problem, DE 10 2008 059 385 A1 proposes a release system having characteristic curve sections.

A further problem, however, is associated with all nonlinear geometries—wave-shaped geometries, for example—of the splittable system. Thus the preparing of a new roll of a wound material in web form involves not only the application of corresponding adhesive splicing tapes to the reels, but also the removal of release media used ("liners") before the actual splicing operation. The forces which occur during removal of the liner generally act radially, but in practice are generally directed in a direction counter to the centrifugal forces which occur during acceleration. As a result of the forces which act during the removal of the liner material, therefore, there are stresses in the splittable system and therefore, in certain cases, an incipient splitting of the splittable strip. Where the splitting system constitutes a coherent sheetlike structure, the unwanted incipient splitting may run over a relatively long section of the splittable system, meaning that the wound roll of web-form material can no longer be used for a smooth splicing operation.

Another problem associated with the wave-form geometries described lies in an increased tendency of such adhesive splicing tapes to form creases, in the region of the splittable elements. In addition to creasing of the adhesive splicing tape itself, therefore, there may be creasing on the part of the web-form material that is wound into rolls. In both cases, unwanted incipient splitting of the adhesive splicing tapes during the acceleration phase, owing to the centrifugal forces which are acting, is promoted. In the event that the adhesive splicing tape is adhered not parallel to the axis of a wound roll of web-form material, i.e., parallel to the roll core, but instead nonrectilinearly—askew, for example—then, after the new web has been joined to the old, the splittable connecting element with wave-form geometry initially opens only in a subregion. On account of its wave-form geometry and of the associated tendency to uncontrolled complete splitting of such connecting elements, the web may become turned over, or may lift, in the region of the front edge of the adhesive splicing tape, causing creases in the region of transition from old to new web. These creases lead to raised regions, i.e., to regions with a particular thickness. Such defects cause problems in the downstream processing operations, and may be the cause of time-consuming and hence costly interruptions to the operations. The increased tendency of the adhesive splicing tapes having connecting elements with wave-form geometry to form creases is manifested also, in particular, in the case of reels, of paperlike material, for example, which have been prepared for a splicing operation and which during their storage are exposed to atmospheric humidity. When, for example, the web-form material is paper, this paper to a certain degree absorbs atmospheric moisture, and so creases or stresses occur in the transition region from web-form material to adhesive splicing tape. These stresses are transferred to the splittable elements of the adhesive splicing tape. In the case of a wave-form geometry, there may be complete opening of the splittable element.

In other words, a nonrectilinear edge design to splittable adhesive tapes within such adhesive splicing tapes as described in DE 10 2005 051 181 A1 gives rise not only to advantages, but is instead also associated with disadvantages. These disadvantages are manifested especially when the splittable adhesive tape is formulated for a "weak" incipient splitting force, this being the maximum force required to overcome the split resistance at the leading edge, in order for the splittable system to split incipiently. This is the case, for example, with very thin papers which easily tear. In such cases, a wave-form configuration of the splittable adhesive tape has the effect of increased incipient splitting of the adhesive splicing tape while the liner is being removed in preparation for the splicing operation, and also causes unwanted creasing of the adhesive tape and/or of the web-form material.

To solve the stated problems, the present invention proposes an adhesive splicing tape as described hereinbelow.

INVENTION

Accordingly, in a first aspect, the present invention relates to adhesive splicing tapes comprising a first carrier and a first splittable connecting element having a left-hand (l) and a right-hand (r) bounding edge, at least one of these two edges (l, r) being nonrectilinear and having projections (V) which are rounded at their furthest projecting points (v), and also a second splittable connecting element having a left-hand (L) and a right-hand (R) bounding edge, at least one of these two edges (L, R) being rectilinear, and the first and second splittable connecting elements being disposed adjacent one another on the carrier.

On its side facing away from the connecting elements, the first carrier of the adhesive splicing tape has a pressure-sensitive adhesive (PSA). Correspondingly, in one preferred embodiment of the invention, the first and/or second splittable connecting elements each have a pressure-sensitive adhesive on their side facing away from the first carrier.

In one preferred embodiment of the invention the first and second splittable connecting elements are disposed adjacent one another on the first carrier in such a way that they do not themselves come into direct contact with one another. If the first and second splittable connecting elements are separated spatially from one another on the carrier, it is possible, in spite of a non-full area splitting system in the form of two splittable connecting elements, to provide an adhesive splicing tape which exhibits an increased incipient splitting force, enabling higher speeds during splicing, since the more highly splitting system is able to withstand greater centrifugal forces and aerodynamic forces. Furthermore, an embodiment of this kind has the effect that it is width-independent, since the energy required to split the adhesive splicing tape ("splitting energy", i.e., the product of the force times the width of the splitting system) is defined by the width of the splittable connecting elements, and not by the width of the adhesive splicing tape itself.

Surprisingly it has been found that, when applied to wound rolls of web-form material for the purpose of preparing for a flying roll changeover, adhesive splicing tapes of the invention prevent creasing in the region of the adhesive tapes and at the same time forestall creasing of the wound web-form material.

In one particularly preferred embodiment of the invention, the first and second splittable connecting elements are disposed adjacent one another on the first carrier in such a way that a nonrectilinear bounding edge (l, r) of the first splittable connecting element and a rectilinear bounding edge (L, R) of the second splittable connecting element are facing away from one another, so that—in other words—a nonrectilinear bounding edge (l, r) and a rectilinear bounding edge (L, R) are each "situated externally" or—alternatively expressed—the bounding edge that is the leading edge in the use direction of the adhesive splicing tape, of the first splittable connecting element, is nonrectilinear in form, and the edge that is the trailing edge in the use direction, of the second, or hind, connecting element is of rectilinear form. This particularly preferred embodiment of the invention produces the effect that the splittable connecting elements of the adhesive splicing tape, when the liner is removed in preparation for the splicing operation, remain in tact in a particularly reliable way—in other words, the risk of unwanted incipient splitting is particularly greatly reduced.

The splittable connecting elements of the adhesive splicing tape of the invention are disposed on the first carrier in such a way that they do not themselves come into direct contact with one another. This means that the connecting elements are disposed at a certain distance to one another. The distance between the connecting elements is a product of the width of the adhesive splicing tape and the width of the individual connecting elements. In one embodiment the connecting elements are disposed at as far as possible a distance from one another. The effect of this is that the time interval between the splitting of the individual connecting elements in the course of the flying roll changeover is as great as possible. This ensures that new and old webs are able to enter into a particularly stable join by means of the adhesive splicing tape. Furthermore, a maximum distance between the splittable connecting elements results in simplified handling in application of adhesive splicing tapes of the invention, since in that case the adhesive splicing tapes in the wound state exhibit an enhanced stability. The connecting elements disposed adjacent one another are preferably connecting elements which are disposed at a distance of 3 mm to 50 mm in relation to one another. The stated distance here is dependent on the respective width of the adhesive splicing tape, which is preferably 38 mm-100 mm.

In one preferred embodiment the splittable connecting elements cover less than 80% of the surface area of the first carrier of the adhesive splicing tape, preferably less than 70%, more preferably less than 60%. This surface coverage correlates with the splitting energy needed for splitting the adhesive splicing tape.

In one embodiment of the invention the incipient splitting force required for splitting the connecting element that is the leading element in the use direction, i.e., the first splittable connecting element, of the adhesive splicing tape, when the resultant split halves are separated at an angle of 90° to the surface plane of the connecting element, i.e., at an angle of 90° to the use direction of the adhesive splicing tape, at a speed of 300 mm/min is 75 cN per centimeter width of the test specimen, i.e., the section of adhesive splicing tape, preferably 70 cN, more preferably 65 cN, and the energy required to split the connecting element that is the leading element in the use direction is not more than 50 Nmm (measured at 23° C. and 50% relative humidity, using a Zwick Roell Z2.5 measuring instrument, in a measurement for which an adhesive splicing tape strip which is 5 cm wide and whose two connecting elements have a width of 10 mm each has been adhered transversely to the measurement direction on the T-block of the measuring instrument, and the top layer of adhesive, disposed on the first carrier, has been covered with standard commercial 80 g/m² copier paper, which for the measurement has been clamped into the clamping jaw). The incipient splitting force and splitting energy required for splitting the connecting element that is the hind element in the use direction, i.e., the second splittable connecting element, may be higher than the values stated in relation to the leading connecting element. The values stated for the required incipient splitting forces are selected and adjusted as a function of the thickness of the material to be joined and as a function of the web speed during the splicing procedure.

In a further preferred embodiment of the invention, the first splittable connecting element, which is the leading element in the use direction, of adhesive splicing tapes of the invention is in the form of a multiplicity of individual sheetlike elements, whereas the second splittable connecting element, which is the hind element in the use direction, is in the form of a single—that is, continuous—sheetlike element. The effect of this is that in the event of unwanted incipient splitting of the first connecting element, it is possible to avoid complete splitting over a longer section of the connecting element.

In accordance with one further embodiment of the present invention, the nonrectilinear bounding edges of the first and optionally of the second splittable connecting element(s) are in each case in the form of a curve (F) which extends along a rectilinear base line (X) ("right-hand curve") and which is characterized by a sequence of rising (s) and falling (f) curve sections; accordingly, between a respective rising curve section (s) and a falling curve section (f) that follows it in a preferential direction, in the curve region formed by these two curve sections, a point situated furthest to the right (Emax) ("maximum") or a plurality of directly adjacent points situated furthest to the right (Bmax) ("maximum region") is formed, and so that between a respective falling curve section (f) and a rising curve section (s) that follows it in the preferential direction, in the curve region formed by these two curve sections, a point situated furthest to the left (Emin) ("minimum") or a plurality of directly adjacent points situated furthest to the left (Bmin) ("minimum range") is formed; for the plurality of curve regions (R) ("right front-projecting curve region") formed by a respective rising curve section (s), by a respective following maximum (Emax) or by a respective maximum range (Bmax) following it in the preferential direction, and by a falling curve section (f) following it in turn in the preferential direction in each case, it is the case that the steepness in the rising curve section (s) is lower than the steepness in the falling curve section (f) that follows it in the preferential direction, with the steepness (for the purposes of this specification) of a curve section denoting the amount of the slope of a straight line "straight steepness line") through the two curve points which bound the curve section. For a better understanding of this embodiment, reference is made to DE 10 2008 059 385 A1, the content of which is hereby made part of the subject matter of the present disclosure.

One development of this embodiment concerns correspondingly configured adhesive splicing tapes, where the nonrectilinear bounding edges is in the form of a curve (F) which extends along a rectilinear base line (X) and has a multiplicity of maxima ($E_{max}$) and minima ($E_{min}$), where the straight steepness line ($G_f$) between a respective minimum ($E_{min}$) and the subsequent maximum ($E_{max}$) of the curve (F) along a preferential direction of the base line (X) has a lower steepness than the straight steepness line ($G_s$) between this maximum ($E_{max}$) and the subsequent minimum ($E_{min}$). For this development as well, reference is made to DE 10 2008 059 385 A1.

In a further, particularly preferred embodiment of the invention, the adhesive splicing tape comprises a second carrier, the first and second splittable connecting elements joining the first carrier in each case to the second carrier of the adhesive splicing tape of the invention, and the first and second carriers each having, on their sides facing away from the connecting elements, a layer of pressure-sensitive adhesive. In a simplest embodiment, the first and second splittable connecting elements here each constitute a laminating composition which is disposed between the first and second carriers.

In one preferred embodiment of the invention, the first and second splittable connecting elements of adhesive splicing tapes of the invention each have a layer of a splittable material which is coated on both sides with a pressure-sensitive adhesive.

Connecting elements and/or materials said to be "splittable" for the purposes of the present invention, accordingly, are those connecting elements or materials which are splittable parallel to their two-dimensional extent, and more particularly those connecting elements and/or materials which also actually split in relation to the requirements in a splice process. "Splittable", furthermore, should be understood for the purposes of the present invention in the sense of "delaminable", if the adhesive splicing tape comprises first and second carriers which are joined solely by laminating composition as the "splittable" connecting element. In this case, the splitting capacity of the connecting elements derives either from a splittability within the two-dimensional extent of the laminating compositions themselves, or from a delaminability of the first or second carrier, respectively, from the laminating composition, this composition remaining nonadhesively.

Materials suitable for the layer of a splittable material include all splittable sheetlike materials, and more particularly readily cleaving papers, craft papers, composite paper systems (examples being duplex papers and glued paper systems), composite film systems (examples being glued film systems), polymeric composite systems (examples being coextruded composite systems), and polymeric nonwovens. For the splittable connecting elements it is advantageous to use a material which has a much lower split resistance than a material which is required to accommodate tensile forces. With particular preference, the material used for a splittable connecting element is a material which has a substantially lower tear propagation resistance than a material or layer of material that accommodates the actual tensile forces in the main plane of the adhesive tape for the purpose of joining the two material webs to one another during the splicing operation. Consequently the splittable connecting element is split open before the first carrier is destroyed or before the first and second carriers are destroyed. The layer of a splittable material is based preferably on paper. Suitability for this purpose is possessed by, for example, the following papers or composite paper systems in particular:

Glued, highly compacted papers

Readily splittable paper systems, examples being papers lacking wet strength

Craft papers (examples being craft papers smooth on both sides—having proven especially suitable is a craft paper 55 μm thick with a basis weight of 65 g/m$^2$)

Duplex papers
  (papers laminated to one another in a defined way; the splitting process is extremely homogeneous; there are no stress peaks caused, for example, by inhomogeneous compaction. These papers are used for producing wallpapers and filters.)

Splittable systems where the splitting forces are determined via the size of the bonding points; systems of this kind are described in DE 198 41 609 A1, for example.

In another embodiment of the invention the first and/or the second splittable connecting element has, as an alternative to the above-described layer of a splittable material, two layers joined by means of laminating composition and having on their side facing away from the laminating composition a first and second layer of pressure-sensitive adhesive, respectively. In this embodiment of the present invention, then, the first and/or second splittable connecting element is not splittable on a single-ply and areal basis, but is instead in the form of two layers which can be parted from one another areally (i.e., are delaminable). They may be, in particular, paper/paper laminates or film/film laminates, or else a laminate of paper with film. The following paper-based and/or film-based laminate or composite systems in particular are, for example, suitable for this purpose:

Duplex papers
(papers laminated to one another in a defined way; the splitting process is extremely homogeneous; there are no stress peaks caused, for example, by inhomogeneous compaction. These papers are used for producing wallpapers and filters.)

Splittable systems where the splitting forces are determined via the size of the bonding points; systems of this kind are described in DE 198 41 609 A1, for example.

For repulpable adhesive tapes in particular, a laminate of two papers is advantageous. Examples of paper laminates of this kind are Highly compacted papers which are glued together in a defined way (especially papers having a high split resistance). Gluing may take place, for example, with starch, starch-containing derivatives, wallpaper pastes based on methylcellulose (Tesa® paste, tesa AG, Hamburg; Methylan®, Henkel KgaA, Dusseldorf) or else on the basis of polyvinyl alcohol derivatives. Laminate systems of this kind are described in EP 0 757 657 A1, for example.

The laminate may also be designed as a laminate of two polymer layers, of a polymer layer with paper, or of a polymer layer with film, the polymer more particularly being a polymer which can be applied by printing technology, such as gravure printing or screen printing or the like. Especially suitable for the polymer here are curing polymer compositions, but also solvent-containing compositions, from which the solvent is removed following application, to form the layer, and also, moreover, polymer compositions which soften in the heated state, hence having sufficient viscosity to allow them to be applied, but which are present in the form of an adequately stable layer at application temperature.

In a further embodiment of the invention, the first and/or the second splittable connecting element, as an alternative to the aforementioned layer of a splittable material, has a layer which is joined to the first or second carrier by means of laminating composition or which is laminated on in another way, so that the connecting element can be delaminated in a sheetlike way from the first or second carrier.

In one particularly preferred embodiment of the invention, the first and/or the second splittable connecting element is disposed, in each case by means of pressure-sensitive adhesive, on the first and/or second carrier of the adhesive splicing tape.

As a laminating composition it is possible for example to use any one which as well as a binder comprises additions which have a weak release activity and are silicone-free and also, as and when necessary, elasticizing. Care should be taken here to ensure that the dried films even at relatively high temperatures do not possess any adhesiveness, so that the areas exposed after splitting do not contaminate mechanical components or production stock or stick to them. For use in paper machines it is desirable for all constituents of the adhesive splicing tape to constitute no disruption to the repulping of papers. Splicing zones which are cut out in the course of further processing can then be repulped with no problems.

Accordingly, water-based compositions, comprising auxiliaries customary in papermaking, are particularly advantageous for the laminating composition. Binders which can be used include, for example, modified starches, or binders of the kind that have long been in use for wet-adhesive tapes. Release agents used may include, for example, talc, stearyl derivatives such as Ca stearate, or dispersions of polymeric release agents, such as dispersions based on copolymers of stearyl methacrylate or stearyl derivatives of maleic acid with styrene, for example. Elasticizing agents used may include, for example, water-soluble polyglycols. More particularly, aqueous preparations with 10%-90% by weight of binder and 10%-90% by weight of release agent, and also up to 60% of elasticizing agents, may be used as a laminating composition. As binders it is preferred to use starch derivatives, such as anionic potato starch, for example, in proportions of 30%-70% by weight. Release agents used are preferably talc, Ca stearate and/or actively releasing copolymers containing stearyl groups, in proportions of 30%-80% by weight. Having proven particularly suitable for elasticization are polypropylene glycols or polyethylene glycols, preferably in amounts between 0%-15% by weight. The relatively high molecular mass products which are solid at room temperature are used chiefly in this context. Other elasticizing agents which are suitable for use in relatively large proportions are gum arabic and plastics having a similar profile of properties. The laminating composition is preferably coated using an applicator mechanism that is suitable for aqueous dispersions, with coating taking place onto a paper carrier or the like, and the applied composition is preferably lined in the wet state with a second paper carrier or the like, and then dried. As and when necessary, it is possible to use the measures which are customary in papermaking, such as remoistening, calendering, and leveling of the composite produced. The layer thickness of the laminating composition after drying is preferably in a range of 3-20 g/sq. m.

Where the first and/or second splittable connecting element comprises two layers joined by means of laminating composition, or where, in an alternative embodiment of the invention, the first and/or the second splittable connecting element comprises a layer which is joined to the first or second carrier by means of laminating composition, the laminating composition may be formed in each case in the form of an areally dense or partial application which is not a full-area application—that is, is not an areally dense application. For this purpose, the laminating composition is applied in each case to one of the layers to be joined or to the carrier, by means of half tone rolls, screen printing or flexographic printing, and is laminated in its wet state together with the other layer to be joined, or with the carrier, and dried. The geometry of the screen or of the half tone roll or flexographic printing plate may be selected so as to produce discrete coated areas which on lamination are not pressed together to form a full area. Lamination in this case consists of small discrete dots. Alternatively, using the stated coating technologies, it is also possible to achieve a full-area coating. All that is necessary in that case is for the coating assemblies to be selected such that on lamination, the coated laminating composition is formed into a full-area film. Full-area coating may likewise take place in stripe coating by means of a wire doctor (Mayer bar) or nozzle coating.

In the case of material produced by screen printing, the screen design dictates the layer thicknesses of the laminating composition. It is preferred to use screens of 14 to 100 mesh with an open area of 7%-60%. The coating rate in terms of dried laminating composition is set in the 2-20 g/sq. m. range.

The preparations used for screen printing are pastelike, nonfoaming, aqueous preparations of relatively high viscosity, with a solids content consisting, for example, of anionic potato starch. Elasticizing additions such as polypropylene glycols or polyethylene glycols, and/or release agents, may be used as well in quantities which are compatible with the main constituent. The adjustment of the splitting forces, i.e., incipient splitting force and split continuation force, is dictated, besides the proportion of release agent, by screen design and by solids concentration.

In order to obtain a clean, unsmudged printed image, the elastic component of the flow behavior of the aqueous preparation must be kept low, so as to prevent stringing. This can be achieved by means for example of additions of talc or small amounts of very finely divided silica gel or other thickeners.

If the laminating compositions are applied by means of half tone roll, the engraving in the half tone roll dictates the layer thickness of the laminating composition. It is preferred to use half tone rolls with a cross-diagonal engraving, more particularly at a 45° angle, for applying the laminating composition. The volumes of the engraving in this case are preferably in the 25-60 $cm^3/m^2$ range. Half tone rolls with line half tones with 10-30 lines/cm can also be used, their volumes being preferably in the 30-90 $cm^3/m^2$ range. In order to coat discrete areas, preference is given to co-rotation between paper carrier and half tone roll.

In the case of coating using a half tone roll, fluid, nonfoaming aqueous preparations are used whose solids content is composed, for example, of anionic potato starch. Elasticizing additions such as polypropylene glycols or polyethylene glycols, and/or release agents, may be used in amounts which are compatible with the main constituent. The splitting forces, i.e., incipient splitting force and split continuation force, are dictated, besides the fraction of release agent, by the engraving of the half tone roll and by the solids concentration.

By specifically adjusting the quantities of the laminating composition between the layers that are joined, it is possible to set varying splitting forces within the splittable connecting elements.

The connecting element that is the leading element in the use direction, i.e., the first splittable connecting element, of adhesive splicing tapes of the invention, in one preferred embodiment, does not finish flush with the first and, optionally, with the second carrier. In the use direction, i.e., in the direction of rotation of the reel furnished with the adhesive splicing tape, this connecting element is recessed, i.e., offset to the rear to some extent. The effect of this is that at the moment of splicing, the join of the running web of the unrolling reel with the reel equipped with the adhesive splicing tape of the invention is produced, and subsequently, with a slight delay, the splitting of the splittable connecting elements begins. The offset of the leading element, i.e., of the first splittable connecting element, in relation to the edge of the first and, optionally, of the second carrier that is leading in the use direction of the adhesive splicing tape, is advantageously up to 20 mm, preferably up to 15 mm, for example 1-3 mm, more preferably 2 mm. The specific offset here is dependent on the carrier material of the adhesive splicing tape and on the web speed of the flat webs that are to be joined. If the offset is too small, the load on the edge of the adhesive splicing tape that is leading in the use direction will generally be very great, since there is no peel effect, or the peel effect is very small. If, however, the offset selected is too great, the leading region of the adhesive splicing tapes is overturned.

As carriers for the first and second carriers of adhesive splicing tapes of the invention it is possible to select any desired carrier materials, more particularly carrier papers or films, it being possible in accordance with the invention for the first and second carriers to be the same or different. Where the first and/or the second splittable connecting element comprises a layer which is joined to the first and/or second carrier of adhesive splicing tapes of the invention by means of laminating composition, then the carrier is selected so as to enable coating of the laminating composition without problems. In one preferred embodiment the carrier material used is paper of a type such that the laminating composition penetrates the paper without passing through it. In one particularly preferred embodiment, the first and/or second carriers of the adhesive splicing tape are paper carriers.

The grammage of the individual carriers is situated preferably in a range from 30 to 80 g/sq. m. The thickness is situated preferably in a range from 30 to 100 µm. In principle the carrier materials selected ought to be as thin as possible. The thinner an adhesive splicing tape, the less the extent to which the adhesive tape interferes with passage through the machines. If the thickness of the individual carriers is above the stated range, it may be the case, depending on the process, that problems will occur on passage through the machines. Where, however, the thickness of the carriers is below the stated range, there may, depending on the web tension, be instances of unwanted tearing, if the tensile strength of the adhesive tape is lower than the web tensions in the processing machine.

For the majority of applications within the paper industry, machine-finished paper having a thickness of 30 µm to 80 µm, preferably 40 to 65 µm, more preferably 50 µm, has proven suitable as a carrier material. In the case of the splicing of relatively thick materials, such as of papers of more than 200 $g/m^2$ or of boards, for the manufacture of beverage cartons, for example, it is also possible to employ thicker carrier materials.

If, in the case of very thin carriers, wet lamination is not possible, it is also possible as laminating compositions to use hotmelt adhesives, preferably repulpable materials based on polyvinylpyrolydone and/or corresponding copolymers or hydroxidepropylcellulose, blended with polar waxes, resins, and release waxes such as stearic acid, for example, and, as and when necessary, with preferably water-soluble plasticizers. When a layer to be joined has been coated in strip form, for example, with a hotmelt adhesive of this kind as a laminating composition, the second layer, or the carrier, is laminated on thermally. The hotmelt adhesive ought as far as possible to have high softening ranges of more than 120° C., so that on contact with hot drying cylinders, in the paper machine, for example, as far as possible no particles of hotmelt adhesive are deposited on these areas. Since hotmelt adhesives are classed in papermaking as potential contaminants, it is preferred not to use this version of the lamination.

On its side facing away from the splittable connecting elements, the first carrier of adhesive splicing tapes of the invention has a layer of pressure-sensitive adhesive (hereinafter "first PSA layer"). As PSA for the first PSA layer it is preferred to use a high-tack adhesive which is preferably repulpable. High tack in this context means that in the end product the PSA has a rolling ball tack of less than 40 mm. For the determination of this value, the respective PSA is applied to a standard polyester carrier (thickness: 23 µm), with a PSA layer thickness of 50 g/m2. A strip of the adhesive tape, approximately 10 cm in length, is fixed with the adhesive side upward, horizontally, on the test plane. A steel test ball (diameter: 11 mm; mass: 5.6 g) is cleaned with acetone and conditioned for 2 hours under ambient conditions (temperature: 23° C.+/−1° C.; relative humidity: 50%+/−1%). For the measurement, the steel ball is accelerated by rolling it down a ramp which is 65 mm high (angle of inclination: 21°) under the Earth's gravitational field. From the ramp the steel ball is steered directly onto the tacky surface of the sample. The distance traveled on the adhesive until the ball reaches standstill is measured, and this is the rolling ball tack. The respective measurement value (reported as length in mm) is a product of the average value from five individual measurements.

The layer thickness of the first PSA layer is preferably 30-60 g/m$^2$.

Used with particular advantage in the sense of the present invention as an adhesive for the first PSA layer is an adhesive comprising 25-45% by weight of a copolymer (a) and also 55-75% by weight of a plasticizer (b), the copolymer (a) being obtainable by copolymerization of a mixture comprising 30-70% by weight acrylic acid, 15-35% by weight butyl acrylate and 15-35% by weight ethylhexyl acrylate, and the plasticizer (b) used being an ethoxylated C16 to C18 alkylamine which has preferably 15 to 25 ethoxy units in the alkyl radical, an example being Ethomeen C/25® from Akzo Nobel.

The PSA which is disposed, in the case of a second carrier, on the side of the second carrier that is facing away from the connecting elements, and also the PSA which (optionally) joins the first and/or second splittable connecting elements to the first and—optionally—second carriers, respectively, and/or the PSA which in the case of an adhesive splicing tape comprising only a first carrier, but not a second carrier, is disposed on the open side of the splittable connecting elements (referred to collectively below as "second PSA"), is preferably a PSA of high shear strength. A PSA of high shear strength for the purposes of the present invention is understood to be a PSA which has a static holdout time under shear of more than 400 minutes on coating base paper and more than 1000 minutes on gravure paper at 23° C. and 55% relative humidity.

For the measurement of these values, the adhesives under test are applied to a standard carrier (polyester film 25 µm thick) at a coat weight of 25 g/m$^2$. After drying and optional crosslinking of the adhesive, a strip 13 mm wide and at least 20 mm long is cut out and is adhered to a defined paper (e.g. Neopress T 54 gravure paper, 54 g/m$^2$, or Mediaprint coating base paper, 135 g/m$^2$, from Stora Enso). The bond area is 13 mm×20 mm. In order to ensure a constant applied pressure when adhering, the test specimen is over-rolled slowly twice with a 2 kg roller. The test specimen produced in this way is loaded with a weight of 500 g parallel to the plane of bonding, at 23° C. and 55% relative humidity, and a measurement is made of the time for which the adhesive strip remains on the paper.

In one embodiment of the invention, the pressure-sensitive adhesive possessing high shear strength that is used for the second PSA layer of the adhesive splicing tape is a self-adhesive acrylate composition comprising 25-45% by weight of a copolymer (a') and also 55-75% by weight of a plasticizer (b'), the plasticizer (b') used being an ethoxylated C16 to C18 alkylamine having preferably 15 to 25 ethoxy units in the alkyl radical, for example being Ethomeen C/25® from Akzo Nobel. The copolymer (a') is obtainable in a radical polymerization reaction in polar solvents, using ethanol as chain transfer agent, optionally with use of an aluminum chelate as crosslinker (0.3% to 1.2% by weight, based on the total amount), from a monomer mixture comprising 40-90% by weight of acrylic acid and also up to 60% by weight of butyl acrylate, and optionally up to 30% by weight of ethylhexyl acrylate. A preferred copolymer (a') is obtainable from a monomer mixture comprising 40-90% by weight of acrylic acid and 10-60% by weight of butyl acrylate. A likewise preferred copolymer (a') is obtainable from a mixture comprising 40-90% by weight of acrylic acid, 15-35% by weight of butyl acrylate, and 15-35% by weight of ethylhexyl acrylate.

The layer thickness of the second PSA layer is preferably 15-30 g/m$^2$.

In a further embodiment of the invention, the first PSA layer is lined with a release medium (liner), i.e., with releasing carrier material, such as with double-sidedly releasing carrier material such as siliconized paper, for example. In another embodiment of the invention, in addition to the first PSA layer, the other open layer, i.e., the second PSA layer, is also lined with a releasing carrier material. In one particular embodiment of the invention, a double-sidedly releasing carrier material is used. In this case it is sufficient to insert only one such carrier material, i.e., only a single liner for example preferably onto the first PSA layer, and to wind up the thus-lined adhesive splicing tape into rolls.

In one particular embodiment of the invention, the release medium has a slit, allowing the release medium to be removed in two steps, with two defined regions of the covered first PSA layer of corresponding adhesive splicing tapes of the invention being exposed. In one particularly preferred embodiment of the invention, both the first and the second splittable connecting element are located on the same side of the slit in the release medium.

The adhesive splicing tape can be provided in various embodiments in accordance with the invention. The width of the adhesive splicing tape is not subject to any particular restrictions, but is preferably in a range from 20 mm to 100 mm, more preferably in a range from 30 mm to 80 mm, very preferably of 38 mm-75 mm. This width is particularly suitable for use for flying roll changeover. In the case of very high-speed machines (coating machines, papermaking) or in the case of materials in web form that are difficult to bond, such as nonpolar films such as PE or PP, for example, the adhesive splicing tapes needed will be wider. For slower machines or for substrates that are easier to bond, as is the case for the majority of paper types, for example, the widths of the adhesive splicing tape can be reduced.

The invention is described in more detail below by reference to a working example, without any intention that the invention should be restricted by such description.

BRIEF DESCRIPTION OF THE DRAWING

FIG. 1 shows a diagrammatic side view of an exemplary adhesive splicing tape of the invention.

Specifically, FIG. 1 shows an adhesive splicing tape (10) having two carriers (14, 15), which are joined by means of two connecting elements (17). Applied on the top face of the first carrier 14 is a first PSA layer (13). Since it is this layer that in the subsequent application produces the contact between outgoing web of the unrolling reel and new material web of the wound reel, this adhesive advantageously has a high-tack formulation. Applied on the bottom face of the second carrier is a second PSA layer (16), application taking place to the paper carrier (15). The pressure-sensitive adhesive (PSA) used for this layer has a high shear strength.

The layer of adhesive 13 is lined with a release medium (11). In the present working example, the release medium 11 has a slit (12), producing two defined regions on the adhesive 13 as a result of separate removal of the two release media (11a, 11b). In application, it is possible first to remove the smaller region (11a), and the end region of the uppermost ply of a wound reel is adhered to the exposed subregion, beneath, of the layer of adhesive 13. After the second PSA layer (16)

has been adhered to the transition from topmost to second-from-topmost ply of the reel, i.e., in the region of transition from the uppermost to the second-uppermost ply of the reel, the larger region (11b) is then removed, thus making the larger area of the PSA layer 13 available for the flying roll changeover.

The connecting elements (17) are offset from the edges toward the middle of the splicing tape (18, 19). The offset that is the leading offset in the use direction is necessary in order to separate the time of initial bonding of the new web from the time of the start of splitting of the first strip of laminating composition. The degree of the offset is dependent on the application speed and on the materials to be spliced. For use at high speeds (up to 1800 m/min), the offset amounts to preferably 1 mm to 3 mm, more preferably 2 mm. For flying roll changeover on calenders and roll reversers (at speeds of 50 m/min-100 m/min), an offset of up to 15 mm, for example, may be selected. The hind offset (19) ought in principle to be selected to be as small as possible, since the hind strip of laminating composition also serves the purpose of ensuring a secure and play-free bond of the splicing tape to the uppermost ply of the wound reel. The closer the strip can be positioned at the end of the adhesive tape, the more secure the adhesive bond can be made. However, the strip ought not to protrude beneath the carriers 14 and 15, so that the offset 19 is produced, optionally, as a result of the manufacturing accuracy of the manufacturing units. The bounding edge (20) that is the lead edge in the use direction, of the connecting element that is the lead element in the use direction, is nonrectilinear in design, whereas the bounding edge that is the rear edge in the use direction, of the connecting element that is the rear element in the use direction, of the adhesive splicing tape shown in FIG. 1 has a rectilinear bounding edge (21).

In accordance with the invention it is possible to provide an adhesive splicing tape which on the one hand prevents unwanted incipient splitting in the preparation of wound reels of web-form material for a corresponding splicing process, and on the other hand prevents creasing in the region of splittable connecting elements within an adhesive splicing tape, and this likewise minimizes the risk of unwanted incipient splitting, especially during the acceleration phase of prepared rolls. The use of adhesive splicing tapes of the invention likewise ensures, in flying roll changeover processes, a reliable avoidance of creases in the region of the radially outer end of the new roll, and so this as well ensures heightened operational stability.

The invention claimed is:

1. An adhesive splicing tape comprising a first carrier and a first splittable connecting element having a left-hand (l) and a right-hand (r) bounding edge, at least one of these two edges (l, r) being nonrectilinear and having projections (V) which are rounded at their furthest projecting points (v), and also a second splittable connecting element having a left-hand (L) and a right-hand (R) bounding edge, at least one of these two edges (L, R) being rectilinear, the first and second splittable connecting elements being disposed adjacent one another on the carrier, and the first splittable connecting element being present in the form of a multiplicity of individual sheetlike elements.

2. The adhesive splicing tape of claim 1, the first and second splittable connecting elements being disposed adjacent one another on the first carrier in such a way that they are not themselves in direct contact with one another.

3. The adhesive splicing tape of claim 1, the first and second splittable connecting elements being disposed adjacent one another on the first carrier in such a way that a nonrectilinear bounding edge (l, r) of the first splittable connecting element and a rectilinear bounding edge (L, R) of the second splittable connecting element are facing away from one another.

4. The adhesive splicing tape of claim 1, the first and second splittable connecting elements having a distance of 3-50 mm to one another.

5. The adhesive splicing tape of claim 1, the first and/or second splittable connecting elements each having a layer of a splittable material, said layer being coated on both sides with a pressure-sensitive adhesive.

6. The adhesive splicing tape of claim 1, the first and/or the second splittable connecting element comprising two layers which are joined by means of laminating composition and which, on their side facing away from the laminating composition, have a first or second layer, respectively, of pressure-sensitive adhesive.

7. The adhesive splicing tape of claim 1, the first and/or the second splittable connecting element comprising a layer which is joined to the first carrier by means of laminating composition.

8. The adhesive splicing tape of claim 1, the first and/or second splittable connecting elements each being disposed by means of pressure-sensitive adhesive on the first carrier.

9. A wound roll of material in web form, comprising an adhesive splicing tape of claim 1.

10. Method for flying splice of flat web material which has been wound to form rolls, said method comprising affixing a topmost flat web of a new roll to an underlying web with an adhesive tape according to claim 1, said adhesive tape being equipped with at least one layer of a self-adhesive on a top face, and at least one layer of a self-adhesive on a bottom face, said method further comprising:
   a) exposing a first part of the self-adhesive on the top face of the adhesive tape and adhering said first part beneath a first ply of a new roll of flat web material;
   b) exposing the self-adhesive on the bottom face of the adhesive tape and adhering the adhesive tape on top of a second ply of said new roll;
   c) exposing a second part of the self-adhesive on the top face of the adhesive tape;
   d) placing the new roll thus equipped adjacent to an old, almost entirely unwound roll that requires replacement;
   e) accelerating the new roll to substantially the same rotational speed as said old roll;
   f) pressing the new roll against the old web so that the exposed second part of the self-adhesive on the top face of the adhesive tape adheres to the old web.

11. An adhesive splicing tape comprising a first carrier and
   a first splittable connecting element having a left-hand (l) and a right-hand (r) bounding edge, at least one of these two edges (l, r) being nonrectilinear and having projections (V) which are rounded at their furthest projecting points (v), and also
   a second splittable connecting element having a left-hand (L) and a right-hand (R) bounding edge, at least one of these two edges (L, R) being rectilinear, and the first and second splittable connecting elements being disposed adjacent one another on the first carrier, and also
   a second carrier, and the first and second splittable connecting elements each joining the first carrier to the second carrier, the first carrier and the second carrier each having a layer of pressure-sensitive adhesive on their sides facing away from the connecting elements.

12. The adhesive splicing tape of claim 11, the first and/or the second splittable connecting element comprising a layer which is joined to the first or second carrier by means of laminating composition.

13. The adhesive splicing tape of claim 11, the first and/or second splittable connecting elements each being disposed by means of pressure-sensitive adhesive on the first and/or second carrier, respectively.

14. Method for flying splice of flat web material which has been wound to form rolls, said method comprising affixing a topmost flat web of a new roll to an underlying web with an adhesive tape according to claim 11, said adhesive tape being equipped with at least one layer of a self-adhesive on a top face, and at least one layer of a self-adhesive on a bottom face, said method further comprising:
 a) exposing a first part of the self-adhesive on the top face of the adhesive tape and adhering said first part beneath a first ply of a new roll of flat web material;
 b) exposing the self-adhesive on the bottom face of the adhesive tape and adhering the adhesive tape on top of a second ply of said new roll;
 c) exposing a second part of the self-adhesive on the top face of the adhesive tape;
 d) placing the new roll thus equipped adjacent to an old, almost entirely unwound roll that requires replacement;
 e) accelerating the new roll to substantially the same rotational speed as said old roll;
 f) pressing the new roll against the old web so that the exposed second part of the self-adhesive on the top face of the adhesive tape adheres to the old web.

\* \* \* \* \*